United States Patent Office 3,313,817
Patented Apr. 11, 1967

3,313,817
4-ALKYL (AND ALKENYL)-1-OXO-1,4-DIHYDRO-4,7-PHENANTHROLINE-2-CARBOXYLIC ACID DERIVATIVES
George Y. Lesher, Schodack, N.Y., assignor to Sterling Drug Inc., New York, N.Y., a corporation of Delaware
No Drawing. Filed Jan. 27, 1964, Ser. No. 340,494
22 Claims. (Cl. 260—287)

This application is a continuation-in-part of my copending application Ser. No. 263,141, filed Mar. 6, 1963, and now abandoned.

This invention relates to 4,7-phenanthroline derivatives.

The invention in its composition aspect is described as residing in the concept of a 1,4-dihydro-4,7-phenanthroline-2-carboxylic acid substituted in the 1-position by oxo and in the 4-position by lower-alkyl or lower-alkenyl.

Illustrative and preferred embodiments of my compounds are those of the Formula I

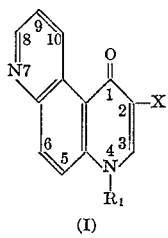

(I)

where X is carboxy or lower-carbalkoxy and $R_1$ is lower-alkyl or lower-alkenyl. The phenanthroline nucleus can bear substituents at positions 5, 6, 8, 9 and 10, and, as noted hereinbelow, at position 7. Said substituents are illustrated by, but not limited to lower-alkyl, lower-alkoxy, hydroxy, halo, lower-alkylamino, lower-alkylmercapto, and the like.

The term "lower-carbalkoxy," as used herein, e.g., for X in Formula I, means carbalkoxy radicals where the alkoxy portion can be straight- or branch-chained and has preferably from one to six carbon atoms, as illustrated by carbomethoxy, carbethoxy, carbo-n-propoxy, carbisopropoxy, carbo-n-butoxy, carbo-n-hexoxy, and the like.

Each of the terms "lower-alkyl" and "lower-alkoxy," as used herein, e.g., as substituents in the phenanthroline ring or for $R_1$ (lower-alkyl only) in Formula I, means lower-alkyl or lower-alkoxy radicals having preferably from one to six carbon atoms which can be arranged as straight or branched chains, and are illustrated by methyl, ethyl, n-propyl, isopropyl, 2-butyl, n-hexyl, etc., for lower-alkyl; and, by methoxy, ethoxy, n-propoxy, isopropoxy, isobutoxy, n-amoxy, n-hexoxy, etc., for lower-alkoxy.

The term "lower-alkenyl," as used herein, e.g., for $R_1$ in Formula I, means alkenyl radicals having preferably from three to six carbon atoms, as illustrated by 2-propenyl, 2-methyl-2-propenyl, 2-butenyl, 3-butenyl, 2-hexenyl, and the like.

The term "halo," as used herein, e.g., as a substituent of the phenanthroline ring, means chloro, bromo, iodo or fluoro.

The invention in its process aspect, is described as residing in the concept of reacting a 1-hydroxy-2-X-4,7-phenanthroline with a lower-alkyl or lower-alkenyl ester of a strong inorganic acid or an organic sulfonic acid, having the formula $R_1$—An, where An is an anion of a strong inorganic acid, i.e., an acid which is practically completely dissociated in aqueous solution, or an organic sulfonic acid, e.g., chloride, bromide, iodide, sulfate, benzenesulfonate, para-toluenesulfonate, and the like, and $R_1$ and X have the meanings given above for Formula I. The chloride, bromide or iodide is preferred because of the more ready availability of the requisite lower-alkyl or lower-alkenyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium bicarbonate, potassium bicarbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, methyl isobutyl ketone, or a mixture of such solvents, e.g., a mixture of water and a lower-alkanol. The reaction is generally carried out at a temperature between about room temperature (about 25° C.) and 150° C., preferably at reflux, in a lower-alkanol solvent, in a mixture of water and a lower-alkanol, or in dimethylformamide.

My process thus comprises reacting the corresponding 1-hydroxy-2-X-4,7-phenanthroline of the Formula II

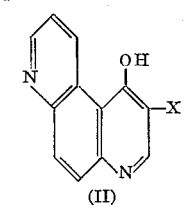

(II)

where X has the meaning given above for Formula I, with an ester having the formula $R_1$—An, where $R_1$ has the meaning given above for Formula I and An is an anion of a strong inorganic acid or an organic sulfonic acid, in the presence of an acid-acceptor.

When X is carboxy, i.e., when the intermediate is a 1-hydroxy-4,7-phenanthroline-2-carboxylic acid, the reaction is conveniently carried out by refluxing the acid with a lower-alkyl or lower-alkenyl ester, preferably halide, in aqueous ethanol in the presence of potassium or sodium hydroxide to yield the corresponding 1,4-dihydro-4-$R_1$-1-oxo-4,7-phenanthroline-2-carboxylic acid; the same 2-carboxylic acid is also obtained using these reaction conditions and a lower-alkyl 1-hydroxy-4,7-phenanthroline-2-carboxylate as the intermediate, the ester hydrolyzing under the reaction conditions to form the acid. If the final product is desired in ester form, e.g., the ethyl ester, the intermediate ethyl 1-hydroxy-4,7-phenanthroline-2-carboxylate is reacted as above using a non-aqueous medium, for example, using refluxing ethanol as the solvent and sodium ethoxide as the acid-acceptor or using dimethylformamide as the solvent and anhydrous potassium carbonate as the acid-acceptor.

Also within the scope of the invention are salts of my above-described 1,4-dihydro-4-$R_1$-1-oxo-4,7-phenanthroline-2-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methyl-glucamine salts. Although therapeutically acceptable salts are preferred, other and all cationic salts are within the scope of my invention. All such salts, including those having toxic cations, are useful in characterizing the free acids and as intermediates in purification of the free acids. The salts are prepared from the acids using conventional methods for converting acids into salts.

Also encompassed by my invention are quaternary-ammonium salts of the aforesaid compounds, quaternization forming at the 7-ring-nitrogen. These salts are useful for further identification of the aforesaid compounds and, also, as intermediates for the preparation of corresponding 8-oxo derivatives described hereinbelow. The quaternary ammonium salts are obtained by the addition of esters having a molecular weight less than about 200 to the free base form of the compounds. A preferred class of esters comprises lower-alkyl, lower-alkenyl or benzyl esters of inorganic acids or organic sulfonic acids of the formula Z—An' where Z is lower-alkyl, lower-alkenyl or benzyl and An' is defined as An above. Z when benzyl can be substituted in the benzene ring by from one to three substituents illustrated by, but not limited to lower-alkyl, lower-alkoxy, halo, nitro, lower-alkylamino, lower-alkylmercapto, and the like. Z—An' is thus illustrated by, but not limited to, methyl chloride, methyl bromide, methyl iodide, ethyl bromide, propyl chloride, isobutyl bromide, allyl chloride, allyl bromide, methyl sulfate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile and the like or, alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

The intermediate 1-hydroxy-4,7-phenanthroline-2-carboxylic acid (Formula II where X is COOH) and its ethyl ester (X is COOC$_2$H$_5$) are known. Other intermediates of Formula II, where novel, are prepared by known methods which are illustrated in the examples.

My invention also comprehends the intermediate 6-alkoxy-1-hydroxy-4,7-phenanthroline-2-carboxylic acid and lower-alkyl esters thereof of the Formula II'

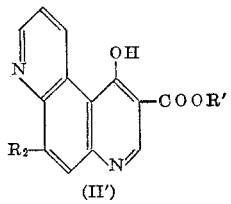

where R' is hydrogen or lower-alkyl, and R$_2$ is lower-alkoxy.

The molecular structures of the final products and intermediates of my invention are established by their modes of synthesis and confirmed by the correspondence of calculated and found values for the elementary analyses for representative examples and by infrared, ultraviolet and NMR spectral analyses.

Embodiments of another aspect of my invention are the 1,4-dihydro-7-substituted-1,8-dioxo compounds of the Formula III

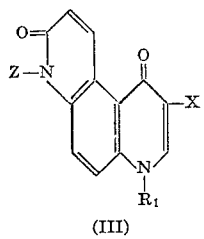

where Z and X have the meanings given hereinabove. The compounds also have antibacterial properties and are prepared by reacting the corresponding compounds of the Formula IV

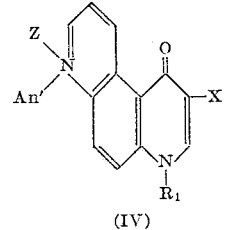

with an oxidizing agent, preferably using a water-soluble ferricyanide, e.g., an alkali ferricyanide, in an alkaline medium. Other suitable oxidizing agents are air and oxygen.

Embodiments of a further aspect of my invention are the 1,4,7,8,9,10-hexahydro compounds of the Formula V

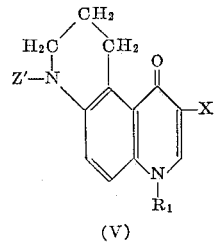

where R$_1$ is lower-alkyl, X has the meaning given hereinabove, and Z' is hydrogen or lower-alkyl. These compounds also have antibacterial properties and are prepared by catalytically hydrogenating the corresponding compounds of Formula I or their corresponding 7-(lower-alkyl) quaternary ammonium derivatives.

My 1,4-dihydro-1-oxo-4-substituted-4,7-phenanthroline-2-carboxylic acids and derivatives have been tested by standard biological evaluation procedures and found to have antibacterial properties, e.g., when tested according to standard in vitro bacteriological evaluation procedures they have been found to possess antibacterial activity, for example, against *Staphylococcus aureus* and *Eberthella typhi*, at test concentration levels in the range of 0.00075 mg./cc. to about 1.0 mg./cc., as illustrated below in the examples. Preferred embodiments were found to have significant in vivo activity against gram-positive bacteria, e.g., *Staphylococcus aureus,* and gram-negative bacteria, e.g., *Klebsiella pneumoniae* and *Escherichia coli,* in Swiss mice when administered orally at dose levels in the range of about 75 to 400 mg./kg./day.

The following examples will further illustrate the invention without, however, limiting it thereto.

*Example 1*

1,4 - dihydro - 4 - methyl - 1 - oxo - 4,7 - phenanthroline-2-carboxylic acid was prepared as follows: A mixture containing 7.5 g. of ethyl 1-hydroxy-4,7-phenanthroline-2-carboxylate and 41 cc. of 10% aqueous potassium hydroxide solution was heated on a steam bath. Several cc. of methyl iodide were added and the reaction mixture heated on a steam bath for fifteen minutes, after which time the reaction mixture was thick with an orange solid. The solid was collected, washed with ethanol and dissolved in water. The aqueous solution was treated with hydrochloric acid and the resulting precipitate was collected, washed with water, dried, recrystallized twice from dimethylformamide, washed with ethanol and dried to yield 4.0 g. of the product, 1,4-dihydro-4-methyl-1-oxo-4,7-phenanthroline-2-carboxylic acid, M.P. 315–319° C.

1,4 - dihydro - 4 - methyl - 1 - oxo - 4,7 - phenanthroline-2-carboxylic acid when administered orally to Swiss mice infected with *Klebsiella pneumoniae, Escherichia coli* and *Staphylococcus aureus* was found to have respective ED$_{50}$'s of 225±60, 72±25 and 106±17 mg./kg./day. This same compound when tested according to standard in vitro bacteriological procedures was found to have antibacterial activity, for example, as follows:

|  | Minimum Effective Concentration (mg./cc.) | |
| --- | --- | --- |
|  | Bacteriostatic | Bactericidal |
| Staphylococcus aureus | 0.025 | 0.075 |
| Diplococcus pneumoniae | 0.05 | 0.075 |
| Pasteurella boviseptica | 0.0025 | 0.025 |
| Klebsiella pneumoniae | 0.05 | 0.5 |
| Escherichia coli | 0.01 | 0.25 |
| Pseudomonas aeruginosa | 0.25 | >1.0 |

1,4 - dihydro - 4 - methyl-1-oxo-4,7-phenanthroline-2-carboxylic acid was found to have an acute oral toxicity ($LD_{50}$) in mice of 1300±202 mg./kg. after twenty-four hours and after seven days, and to have an acute intravenous toxicity ($LD_{50}$) in mice of 245±19 mg./kg. after twenty-four hours and 216±15 mg./kg. after seven days.

Example 2

Ethyl 1,4-dihydro - 4 - methyl-1-oxo-4,7-phenanthroline-2-carboxylate was prepared by esterifying the corresponding acid as follows: A mixture containing 127 g. of 1,4-dihydro-4-methyl-1-oxo-4,7 - phenanthroline - 2 - carboxylic acid, 250 g. of oxalyl chloride and 3500 cc. of dry chloroform was refluxed with stirring for eight hours to yield a solution of the corresponding 3-carboxylic acid chloride. To this solution was added dropwise with stirring 300 cc. of ethyl alcohol. The reaction mixture was refluxed for one hour and allowed to cool. The solid was collected and triturated with chloroform and filtered to yield 145 g. of the product in the form of its hydrochloride. The salt was dissolved in warm water (about 1 liter) and the warm solution was adjusted to a pH of 7.0 using 10% potassium bicarbonate solution, whereupon a solid gradually separated. The mixture was placed in an ice bath for three hours and the precipitate collected. The precipitate was triturated with a mixture containing cold water and 10% aqueous potassium hydroxide solution, the mixture filtered, the solid triturated with cold water containing enough 6 N hydrochloric acid solution so that the mixture was neutral, and the mixture filtered. The precipitate was recrystallized from about 3.5 liters of acetone to yield 107 g. of the product, ethyl 1,4-dihydro - 4 - methyl-1-oxo-4,7-phenanthroline-2-carboxylate, M.P. 216–219° C. A sample recrystallized from acetone for analysis melted at 213.2–215.6° C. (corr.). Ethyl 1,4 - dihydro - 4 - methyl-1-oxo-4,7-phenanthroline-2- carboxylate was found to have in vivo activity against *Staphylococcus aureus* in mice when administered orally at a dose level of 200 mg./kg./day (10 out of 10 mice survived).

Example 3

1,4 - dihydro - 4 - ethyl-1-oxo-4,7-phenanthroline-2-carboxylic acid was prepared as follows: A 30.5 g. portion of 1-hydroxy-4,7-phenanthroline-2-carboxylic acid hydrochloride was dissolved in 200 cc. of 10% aqueous potassium hydroxide solution and the solution concentrated to one half its original volume. To this solution was added 350 cc. of ethanol and 15 cc. of ethyl iodide, and the resulting mixture was refluxed on a steam bath. After two and one half hours of refluxing, a solution containing 13 g. of potassium hydroxide in a minimal amount of water and 25 cc. of ethyl iodide were added, and refluxing was continued for an additional eight hours. The reaction mixture was filtered and the filtrate acidified with excess 6 N hydrochloric acid whereupon the solid began to crystallize out. The mixture was chilled and the solid then collected. The solid was dissolved in aqueous potassium hydroxide solution, the solution poured into a threefold excess of 6 N hydrochloric acid, and the mixture chilled in an ice bath. The resulting precipitate was collected, dried and recrystallized from 230 cc. of 6 N aqueous hydrochloric acid. The solid was dissolved in aqueous potassium hydroxide, the mixture filtered, and the filtrate acidified with acetic acid. The resulting white precipitate was collected and dried to yield 3.4 g. of the product, 1,4-dihydro-4-ethyl - 1 - oxo - 4,7-phenanthroline-2-carboxylic acid, M.P. 272.0–276.3° C. (corr.).

When tested by standard in vitro bacteriological evaluation procedures, 1,4 - dihydro - 4 - ethyl - 1 - oxo - 4,7-phenanthroline-2-carboxylic acid was found to have bacteriostatic activity against *Staphylococcus aureus* and *Eberthelli typhi* at respective concentrations of 0.05 mg./cc. and 0.0075 mg./cc., and to have bactericidal activity against the same organisms at 1.0 mg./cc. and 0.75 mg./cc., respectively.

Example 4

Ethyl 1,4 - dihydro - 1 - oxo-4-n-propyl-4,7-phenanthroline-2-carboxylate was prepared as follows: A mixture containing 24.1 g. of ethyl 1-hydroxy-4,7-phenanthroline-2-carboxylate, 37.3 g. of anhydrous potassium carbonate, 300 cc. of dimethylformamide and 30.6 g. of n-propyl iodide was heated on a steam bath with stirring for three hours. The reaction mixture was poured onto 1600 g. of ice and the mixture stirred. The yellow solid was collected and recrystallized from ethanol, using decolorizing charcoal, to yield 18.8 g. of the product, ethyl 1,4-dihydro - 1 - oxo-4-n-propyl-4,7-phenanthroline - 2-carboxylate, M.P. 185.6–187.6° C. (corr.).

Example 5

1,4-dihydro-1-oxo-4-n-propyl-4,7 - phenanthroline-2-carboxylic acid was prepared as follows: A mixture containing 30 g. of 1-hydroxy-4,7-phenanthroline-2-carboxylic acid hydrochloride, 200 cc. of 10% aqueous potassium hydroxide solution, 400 cc. of ethanol and 35 g. of n-propyl bromide was refluxed on a steam bath over the weekend. The reflux condenser was removed and about 200 cc. of solvents were allowed to boil off. The mixture was treated with decolorizing charcoal, filtered, and the filtrate acidified with hydrochloric acid. The solid was filtered off and dried to yield 16 g. of the starting material. From the filtrate, crystalline solid slowly separated. After standing for one week, the crystals were collected and reprecipitated by dissolving them in aqueous potassium hydroxide solution and neutralizing the solution with hydrochloric acid. The solid was recrystallized once from dimethylformamide and then dissolved in 50 cc. of concentrated ammonium hydroxide and the solution heated on a steam bath for four hours. The white solid that separated during this heating period was collected, dried and recrystallized from dimethylformamide to yield 3.8 g. of the product, 1,4-dihydro-1-oxo-4-n-propyl-4,7-phenanthroline - 2 - carboxylic acid, M.P. 261.2–263.4° C. (corr.).

When tested by standard in vitro bacteriological evaluation procedures, 1,4-dihydro-1-oxo-4-n-propyl-4,7-phenanthroline-2-carboxylic acid was found to have bacteriostatic activity against *Staphylococcus aureus* and *Eberthella typhi* at respective concentrations of 0.05 mg./cc. and 0.25 mg./cc.

Example 6

4-allyl-1,4-dihydro-1-oxo - 4,7-phenanthroline - 2 - carboxylic acid was prepared as follows: A mixture containing 60.3 g. of ethyl 1-hydroxy-4,7-phenanthroline-2-carboxylate and 115 cc. of 10% aqueous potassium hydroxide solution was heated on a steam bath for two hours and filtered. The filtrate containing the dipotassium salt of 1-hydroxy-4,7-phenanthroline-2-carboxylic acid was divided into three portions of 150 cc. each, one of which was used as follows in this preparation. The 150 cc. portion was concentrated to a volume of about 100 cc., 300 cc. of ethanol and 20 cc. of allyl bromide were added, and the resulting mixture refluxed gently for forty-five minutes. The reaction mixture was concentrated to remove the solvent and the residual material was heated on a steam bath with about 75 cc. of water. The aqueous mixture was cooled, filtered, and the filtrate heated on a steam bath with about 250 cc. of ethanol. The ethanol solution was cooled and the resulting precipitate was collected, triturated with about 75 cc. of ethanol, the mixture filtered, and the solid dissolved in excess acetone. After filtering, the filtrate was evaporated to about 250 cc. and cooled. This recrystallization from acetone was repeated and the resulting solid was dried in a vacuum oven at 60° C. to yield 2.3 g. of the product, 4-allyl-1,4-dihydro-1-oxo-4,7-phenanthroline-2-carboxylic acid, M.P. 229–237° C. (corr.), with decomposition.

Example 7

4-n-butyl-1,4-dihydro-1-oxo - 4,7-phenanthroline-2-carboxylic acid was prepared as follows: A mixture containing 24.1 g. of ethyl 1-hydroxy-4,7-phenanthroline-2-carboxylate, 27.6 g. of anhydrous potassium carbonate, 24.7 g. of n-butyl bromide and 350 cc. of dimethylformamide was heated with stirring on a steam bath for five hours. The reaction mixture was filtered and the filtrate concentrated in vacuo to yield a residual material containing ethyl 4-n-butyl-1,4-dihydro-1-oxo-4,7 - phenanthroline-2-carboxylate. To this material was added 150 cc. of water and 103 cc. of 10% aqueous potassium hydroxide solution, and the resulting mixture was heated on a steam bath for ninety minutes and filtered. On cooling, an oil phase separated from the filtrate, whereupon the mixture was heated an additional two hours on a steam bath. To the warm solution was added 35 cc. of 6 N hydrochloric acid and warm water, whereupon there separated an oily material which solidified on cooling. The solid was dissolved in 50 cc. of 10% aqueous potassium hydroxide solution plus water. This solution was heated on a steam bath and to it was added with stirring 6 N hydrochloric acid until a pH of 7 was reached. The resulting precipitate was collected, washed with ethanol and recrystallized from about two liters of ethanol, using decolorizing charcoal, to yield 16.7 g. of the product, 4-n-butyl-1,4-dihydro-1-oxo - 4,7 - phenanthroline-2 - carboxylic acid, M.P. 212.6–214.6° C. (corr.).

Example 8

1,4 - dihydro - 6 - methoxy - 4 - methyl - 1 - oxo - 4,7-phenanthroline-2-carboxylic acid was prepared as follows: A mixture containing 12.2 g. of 1-hydroxy-6-methoxy-4,7-phenanthroline-2-carboxylic acid, 70 cc. of 10% aqueous potassium hydroxide solution, 100 cc. of water, 175 cc. of ethanol and 5 cc. of methyl iodide was refluxed on a steam bath for about four hours, with further frequent additions of methyl iodide and ethanol during the heating period. A total of about 20 cc. of methyl iodide and 250 cc. of ethanol were used in the reaction. The reaction solution was chilled and the resulting precipitate collected. The precipitate was dissolved in 500 cc. of hot water and the solution made strongly acidic with 25 cc. of acetic acid. The acidic solution was chilled and the solid that separated was collected, recrystallized from 350 cc. of dimethylformamide, washed with ethanol and dried to yield 3.5 g. of the product, 1,4-dihydro-6-methoxy-4-methyl-1-oxo - 4,7 - phenanthroline - 2 - carboxylic acid, M.P. 325–328° C.

1,4 - dihydro - 6 - methoxy - 4 - methyl - 1 - oxo - 4,7-phenanthroline-2-carboxylic acid when tested by standard in vitro bacteriological procedures was found to have bacteriostatic activity against *Staphylococcus aureus* and *Eberthella typhi* at respective concentrations of 0.025 mg./cc. and 0.05 mg./cc., and to have bactericidal activity against *Staphylococcus aureus* at a concentration of 0.75 mg./cc.

The intermediate 1-hydroxy-6-methoxy-4,7-phenanthroline-2-carboxylic acid was prepared in several steps as follows: A mixture containing 33 g. of 6 - amino - 8-methoxyquinoline and 42 g. of diethyl ethoxymethylenemalonate was heated on a steam bath for two hours, 100 cc. of ethanol was added, and the mixture placed in a refrigerator. The resulting solid was collected, washed with about 50 cc. of cold ethanol and recrystallized twice, once from ethanol and once from Skellysolve E (mixed octanes, B.P. 100–140° C.) using decolorizing charcoal, to yield 52.6 g. of diethyl N-(8-methoxy-6-quinolyl)aminomethylenemalonate, M.P. 118.2–119.2° C. (corr.), after washing with n-pentane and drying at 60° C. in a vacuum oven.

A mixture containing 46 g. of diethyl N-(8-methoxy-6-quinolyl)aminomethylenemalonate and 650 cc. of Dowtherm A (eutectic mixture of diphenyl and diphenyl ether) was heated rapidly to reflux with stirring and then refluxed for about eight minutes at 245–248° C. The reaction mixture was allowed to cool with stirring. The solid that separated was collected, triturated with warm benzene, washed with n-pentane and dried to yield 37 g. of ethyl 1-hydroxy-6-methoxy-4,7-phenanthroline-2-carboxylate, M.P. 313° C. with decomposition.

A mixture containing 36.5 g. of ethyl 1-hydroxy-6-methoxy-4,7-phenanthroline-2-carboxylate and 135 cc. of 10% aqueous potassium hydroxide solution was heated on a steam bath for 105 minutes. After crystals had separated on cooling the reaction mixture, an additional 51 cc. of 10% aqueous potassium hydroxide solution was added and the resulting mixture heated for one hour on a steam bath, treated with decolorizing charcoal, and filtered. The filtrate was poured into water containing an excess of hydrochloric acid. The resulting precipitate was collected, triturated successively with water, ethanol and ether, and dried for two hours at 60° in a vacuum oven to yield 30.0 g. of 1 - hydroxy - 6 - methoxy-4,7-phenanthroline-2-carboxylic acid, M.P. 320° C. with decomposition. An 8 g. sample was recrystallized from 225 cc. of dimethyl sulfoxide to yield 6.1 g. of the acid, melting at 330° C. with decomposition, after washing with ethanol and drying at 60° C. in a vacuum oven.

Example 9

1,4 - dihydro - 4,7 - dimethyl - 1 - oxo - 4,7-phenanthrolinium-2-carboxylic acid methosulfate was prepared as follows: A mixture containing 10.4 g. of 1,4-dihydro-4-methyl-1-oxo-4,7-phenanthroline - 2 - carboxylic acid and 100 cc. of dimethyl sulfate was refluxed for about ten minutes, allowed to cool slightly, diluted with 400 cc. of acetone and allowed to cool to room temperature. The supernatant liquid was decanted from a mixture of a solid and semi-solid precipitate which was then triturated with acetone. The solid was dissolved in about 70 cc. of hot water; and the aqueous solution was treated with decolorizing charcoal and filtered. The hot filtrate heated on a steam bath was diluted to a volume of about 220 cc. with acetone and allowed to cool. The resulting precipitate was recrystallized a second time from water-acetone and dried in a vacuum oven at 70° C. to yield 11.8 g. of the product, 1,4-dihydro-4,7-dimethyl-1-oxo-4,7-phenanthrolinium-2-carboxylic acid methosulfate at its monohydrate, M.P. 289.8–299.2° C. (corr.) with decomposition.

*Analysis.*—Calcd. for $C_{16}H_{16}N_2O_7S \cdot H_2O$: C, 48.23; H, 4.56; N, 7.13; $H_2O$, 4.5. Found: C, 48.35; H, 4.48; N, 7.13; $H_2O$, 3.80.

Reaction of ethyl 1,4 - dihydro - 4 - methyl-1-oxo-4,7-phenanthroline-2-carboxylate (564 g.) with dimethyl sulfate (200 cc.) as above gave ethyl 1,4-dihydro-4,7-dimethyl-1-oxo-4,7-phenanthrolinium - carboxylate methosulfate (28.4), M.P. 275–277° C. with decomposition.

Example 10

Ethyl 4,7-dimethyl-1,8-dioxo-1,4,7,8-tetrahydro-4,7-phenanthroline-2-carboxylate was prepared as follows: To an ice cold solution containing 28.6 g. of potassium ferricyanide in 260 cc. of water was added simultaneously with stirring two other ice cold solutions, one containing 15.8 g. of ethyl, 1,4-dihydro-4,7-dimethyl-1-oxo-4,7-phenanthrolinium-2-carboxylate methosulfate in 300 cc. of water and the other containing 7.2 g. of sodium hydroxide in 130 cc. of water. The addition took place over a period of about ten minutes, keeping the reaction temperature at 10 to 15° C. After the reaction mixture had been stirred for an additional fifteen minutes, the precipitate was collected, triturated with cold water, recrystallized from about 350 cc. of dimethyl sulfoxide, triturated with hot ethanol and dried to yield 5.5 g. of the product, ethyl 4,7 - dimethyl - 1,8 - dioxo - 1,4,7,8 - tetrahydro-4,7-phenanthroline-2-carboxylate.

A 5.3 g. portion of ethyl 4,7-dimethyl-1,8-dioxo-1,4,7,8-tetrahydro-4,7-phenanthroline-2-carboxylate was hydrolyzed by heating it on a steam bath for about forty-five minutes with an excess of 10% aqueous potassium hydroxide solution. The reaction mixture was treated with decolorizing charcoal and filtered. The filtrate was diluted with water to a volume of about 250 cc. and made acidic with an excess of 6 N hydrochloric acid. The resulting precipitate was collected, washed with water, triturated twice with hot water and dried in a vacuum oven at 100° C. for twenty hours to yield 4.5 g. of the product, 4,7 - dimethyl - 1,8 - dioxo - 1,4,7,8 - tetrahydro-4,7-phenanthroline-2-carboxylic acid, M.P. 365° C. with decomposition.

4,7 - dimethyl - 1,8 - dioxo - 1,4,7,8 - tetrahydro - 4,7-phenanthroline-2-carboxylic acid was found to have bacteriostatic activity against *Staphylococcus aureus* and *Eberthella typhi* at respective concentrations of 0.025 mg./cc. and 0.00075 mg./cc., and to have bactericidal activity against the same two organisms at respective concentrations of 1.0 mg./cc. and 0.1 mg./cc. This compound was found to have in vivo activity against *Klebsiella pneumoniae* in mice when administered subcutaneously at a dose level of 100 mg./kg./day (8 out of 10 mice survived.).

*Example 11*

Ethyl 1,4,7,8,9,10 - hexahydro - 4 - methyl - 1 - oxo - 4,7-phenanthroline-2-carboxylate was prepared as follows: A mixture containing 5.6 g. of ethyl 1,4-dihydro-4-methyl-1-oxo-4,7-phenanthroline-2-carboxylate, 300 cc. of absolute ethanol and 1 g. of 10% palladium on charcoal was hydrogenated in a Parr apparatus using an initial temperature of 60° C. and an initial pressure of hydrogen of 51 p.s.i. To the hot reaction mixture was added about 50 cc. of ethanol, the mixture filtered and the filtrate evaporated on a steam bath to a volume of about 250 cc. The solution was chilled in an ice bath and the solid that separated was collected, recrystallized from acetone and dried at 85° C. in a vacuum oven to yield 3.4 g. of the product, ethyl 1,4,7,8,9,10-hexahydro-4-methyl-1-oxo-4,7-phenanthroline-2-carboxylate, M.P. 233.2–235.6° C. (corr.).

Ethyl 1,4,7,8,9,10 - hexahydro - 4 - methyl - 1 - oxo - 4,7-phenanthroline-2-carboxylate was found to have bacteriostatic activity against *Staphylococcus aureus* and *Eberthella typhi* at concentrations of 0.5 mg./cc. and 0.75 mg./cc., respectively.

1,4,7,8,9,10 - hexahydro - 4 - methyl - 1 - oxo - 4,7-phenanthroline-2-carboxylic acid is obtained by hydrolysis of its ethyl ester following the hydrolysis procedure described in Example 10 and using corresponding molar equivalent quantities of the ester and potassium hydroxide.

*Example 12*

4,7 - dimethyl - 1,4,7,8,9,10 - hexahydro - oxo - 4,7-phenanthroline-2-carboxylic acid was prepared as follows: A 11.4 portion of 1,4-dihydro-4,7-dimethyl-1-oxo-4,7-phenanthrolinium-2-carboxylic acid methosulfate monohydrate was hydrogenated in a Parr apparatus using 150 cc. of water, 1 g. of 10% palladium on charcoal, an initial pressure of 51 p.s.i. and a reaction temperature of 60° C. About 20 cc. of 6 N hydrochloric acid solution was added to the reaction mixture which was then filtered. The filtrate was adjusted to a pH of 6 using 10% potassium hydroxide solution. The resulting yellow precipitate was collected, dissolved in 5% aqueous potassium hydroxide solution and the solution filtered through a sin-

TABLE A

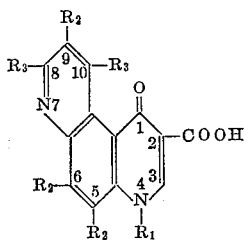

| Example | $R_1$ | $R_2$ | | | $R_3$ | |
|---|---|---|---|---|---|---|
| | | 5 | 6 | 9 | 8 | 10 |
| 13 | $C_2H_5$ | H | H | H | $CH_3$ | $OCH_3$ |
| 14 | n-$C_6H_{13}$ | H | H | H | $CH_3$ | H |
| 15 | $CH_3$ | H | Br | H | H | H |
| 16 | $C_2H_5$ | Cl | H | H | H | H |
| 17 | $CH_2CH=CH_2$ | $C_2H_5$ | H | H | H | H |
| 18 | $CH_2CH=CHCH_3$ | H | $C_2H_5$ | H | H | H |
| 19 | i-$C_3H_7$ | H | Cl | H | H | H |
| 20 | 2-$C_4H_9$ | H | $CH_3$ | H | H | H |
| 21 | $CH_3$ | $CH_3$ | $CH_3$ | H | H | H |
| 22 | $C_2H_5$ | H | $CH_3$ | H | H | $C_2H_5$ |
| 23 | $CH_3$ | $CH_3$ | H | H | H | $C_2H_5$ |
| 24 | $CH_2CH_2CH=CH_2$ | H | $OC_2H_5$ | H | H | H |
| 25 | $CH_3$ | H | H | H | H | H |
| 26 | $C_2H_5$ | H | H | H | $CH_3$ | $OC_4H_9$-n |
| 27 | $CH_3$ | H | H | H | $CH_3$ | $CH_3$ |
| 28 | $CH_3$ | Br | H | Cl | H | H |
| 29 | $CH_3$ | Br | H | $OCH_3$ | H | H |
| 30 | $CH_3$ | Br | H | $CH_3$ | H | H |
| 31 | $CH_3$ | H | $CH_3$ | H | $CH_3$ | H |
| 32 | $CH_2CH=CH(CH_2)_2CH_3$ | Cl | H | H | H | H |
| 33 | n-$C_3H_7$ | H | H | H | $OC_3H_7$-n | H |
| 34 | $C_2H_5$ | H | H | H | $OC_4H_9$-n | H |
| 35 | $CH_3$ | Br | H | H | H | H |
| 36 | $CH_3$ | H | $CH_3$ | $CH_3$ | H | H |
| 37 | $C_2H_5$ | $OC_2H_5$ | H | H | H | H |
| 38 | $CH_3$ | $OCH_3$ | $OCH_3$ | H | H | H |
| 39 | $CH_3$ | H | n-$C_4H_9$ | H | H | H | tered glass funnel. The filtrate was adjusted to a pH of 4 using hydrochloric acid and the resulting precipitate was collected, recrystallized twice from dimethylformamide, triturated with ethanol and dried at 60° C. in a vacuum oven to yield the product, 4,7-dimethyl-1,4,7,8,9, 10-hexahydro-1-oxo-4,7-phenanthroline-2-carboxylic acid, M.P. 253.6–254.8° C. (corr.).

Following the procedure described in Examples 1, 3, 5, 6, 7 and 8 and using corresponding molar equivalent quantities of the appropriate 1-hydroxy-4,7-phenanthroline-2-carboxylic acid and lower-alkyl or lower-alkenyl ester, preferably bromide, iodide or sulfate, the compounds of Table A can be prepared.

The intermediate 1-hydroxy-4,7-phenanthroline-2-carboxylic acids needed to prepare the compounds of Table A can be prepared in three steps following the procedures described in Example 8 for the preparation of 1-hydroxy-6-methoxy-4,7-phenanthroline-2-carboxylic acid and using corresponding molar equivalent quantities of the appropriate reactants, illustrated as follows for the compound of Example 13: diethyl N-(4-methoxy-2-methyl-6-quinolyl)-aminomethylenemalonate is obtained by reacting 6-amino-4-methoxy-2-methylquinoline with diethyl ethoxymethylenemalonate; ethyl 1-hydroxy-10-methoxy-8-methyl-4,7-phenanthroline-2-carboxylate is formed next in the cyclization step; and, 1-hydroxy-10-methoxy-8-methyl-4,7-phenanthroline-2-carboxylic acid is prepared by hydrolysis of the ethyl ester.

The lower-alkyl esters of the acids of Table A can be obtained either: by following the procedure of Example 2 using corresponding molar equivalent quantities of the 1,4 - dihydro-4-$R_1$-4-oxo-4,7-phenanthroline-2-carboxylic acid (of Table A) and the appropriate lower-alkanol, e.g., n-hexyl 5-bromo-1,4-dihydro-9-methoxy-4-methyl-1-oxo-4,7-phenanthroline-2-carboxylate is obtained using the acid of Example 29 of Table A and n-hexanol; or, by following the procedure of Example 4 using corresponding molar equivalent quantities of the appropriate ethyl 1-hydroxy-4,7-phenanthroline-2-carboxylate and lower-alkyl or lower-alkenyl ester, e.g., ethyl 1,4-dihydro-4,5-dimethyl-10-ethyl-1-oxo-4,7-phenanthroline-2-carboxylate is obtained by reacting ethyl 10-ethyl-1-hydroxy-5-methyl-4,7-phenanthroline-2-carboxylate (an intermediate for Example 23 of Table A) with methyl iodide.

*Example 40*

1,4 - dihydro - 6-hydroxy-4-methyl-1-oxo-4,7-phenanthroline-2-carboxylic acid was prepared as follows: A mixture containing 2.1 g. of 1,4-dihydro-6-methoxy-4-methyl-1-oxo-4,7-phenanthroline-2-carboxylic acid and 40 cc. of 48% aqueous HBr was heated on a steam bath for about 40 hours. During the heating period, a solid gradually separated from the solution and the reaction mixture gradually evaporated to dryness. The residue was triturated with about 200 cc. of hot water and the mixture filtered. The filter cake was dissolved in aqueous potassium hydroxide solution; the resulting solution was neutralized with aqueous hydrochloric acid; and, the resulting precipitate was collected, washed with water and dried in vacuo at 80° C. to yield 1.5 g. of the product, 1,4-dihydro - 6 - hydroxy-4-methyl-1-oxo-4,7-phenanthroline-2-carboxylic acid, M.P. >300° C.

1,4 - dihydro - 6 - hydroxy-4-methyl-1-oxo-4,7-phenanthroline-2-carboxylic acid was found to have bacteriostatic activity against *Eberthella typhi* and *Clostridium welchii* at respective concentrations of 0.05 mg./cc. and 0.025 mg./cc., and to have bactericidal activity against the same two organisms at respective concentrations of 0.01 mg./cc. and 0.10 mg./cc. This compound was found to have in vivo activity against *Klebsiella pneumoniae* in mice when administered subcutaneously at a dose level of 200 mg./kg./day (7 out of 10 mice survived).

Following the procedures described in Example 9 and using corresponding molar equivalent quantities of the appropriate 1,4 - dihydro-1-oxo-4-$R_1$-4,7-phenanthroline-2-carboxylic acids of Examples 3, 5–8 and 13–39 or their lower-alkyl esters and the appropriate lower-alkyl, lower-alkenyl or benzyl ester, Z—An′, the corresponding 7-quaternary ammonium salts can be obtained, for example: 7-allyl-1,4-dihydro-4-ethyl-1-oxo-4,7-phenanthrolinium-2-carboxylic acid bromide using the acid of Example 3 and allyl bromide; ethyl 7-n-butyl-1,4-dihydro-1-oxo-4-n-propyl-4,7-phenanthrolinium-2-carboxylate iodide using the ethyl ester of Example 4 and n-butyl iodide; 7-benzyl-1,4 - dihydro - 4-methyl-1-oxo-4,7-phenanthrolinium-2-carboxylic acid chloride using the product of Example 1 and benzyl chloride; and 1,4-dihydro-7-(2-methoxybenzyl) - 4-methyl-1-oxo-4,7-phenanthrolinium-2-carboxylic acid bromide using the product of Example 1 and 2-methoxybenzyl bromide.

Following the oxidative procedure described in Example 10 and using corresponding molar equivalent quantities of the appropriate 1,4-dihydro-1-oxo-4-$R_1$-7-Z-4,7-phenanthrolinium-2-carboxylic acid (or ester) salts derived from the compounds of Examples 3–8, 15–25, 28–30, 32 and 35–39, the corresponding 1,8-dioxo-4-$R_1$-7-Z-1,4,7,8-tetrahydro-4,7-phenanthroline-2-carboxylic acid (or ester) can be prepared, for example: 7-allyl-1,8-dioxo-4-ethyl-1,4,7, 8-tetrahydro-4,7-phenanthroline-2-carboxylic acid, ethyl 7 - n - butyl-1,8-dioxo-4-n-propyl-1,4,7,8-tetrahydro-4,7-phenanthroline-2-carboxylate, 7-benzyl-1,8-dioxo-4-methyl-1,4,7,8-tetrahydro-4,7-phenanthroline-2-carboxylic acid and 7 - (2 - methoxybenzyl)-1,8-dioxo-4-methyl-1,4,7,8-tetrahydro-4,7-phenanthroline-2-carboxylic acid.

Following the hydrogenation procedure of Examples 11 and 12 using corresponding molar equivalent quantities of appropriate 1,4-dihydro-1-oxo-4-$R_1$-4,7-phenanthroline-2-carboxylic acids or derivatives described hereinabove, e.g., the compounds of Examples 1, 3–5, 7, 8, 13, 14, 20–23, 25–27, 31, 33, 34, 36–39, their lower-alkyl esters or 7-Z′ quaternary ammonium salts where Z′ is lower-alkyl, the corresponding 1,4,7,8,9,10-hexahydro-1-oxo-4-$R_1$-4,7-phenanthroline-2-carboxylic acid, ester or 7-Z′ derivative can be prepared, for example: 4-n-butyl-1,4,7,8,9,10-hexahydro-1-oxo-4,7-phenanthroline-2-carboxylic acid, ethyl 7-n-butyl - 1,4,7,8,9,10 - hexahydro-1-oxo-4-n-propyl-4,7-phenanthroline-2-carboxylate, 7-ethyl-1,4,7,8,9,10-hexahydro-4-methyl-1-oxo-4,7-phenanthroline-2-carboxylic acid and 4 - ethyl - 1,4,7,8,9,10-hexahydro-10-methoxy-8-methyl-1-oxo-4,7-phenanthroline-2-carboxylic acid.

I claim:
1. A compound of the formula

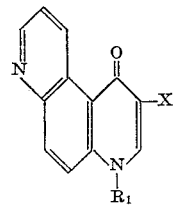

where X is a member selected from the group consisting of carboxy and lower-carbalkoxy, and $R_1$ is a member selected from the group consisting of lower-alkyl and lower-alkenyl.

2. A compound of the formula

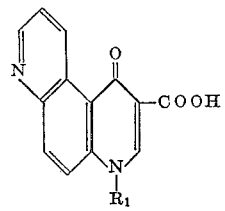

where $R_1$ is lower-alkyl.

3. A compound of the formula

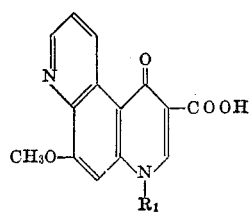

where $R_1$ is lower-alkyl.

4. 1,4 - dihydro - 4 - methyl-1-oxo-4,7-phenanthroline-2-carboxylic acid.

5. Ethyl 1,4 - dihydro-4-methyl-1-oxo-4,7-phenanthroline-2-carboxylate.

6. 1,4 - dihydro-4-ethyl-1-oxo-4,7-phenanthroline-2-carboxylic acid.

7. 1,4 - dihydro - 1 - oxo-4-propyl-4,7-phenanthroline-2-carboxylic acid.

8. 4 - allyl-1,4-dihydro-1-oxo-4,7-phenanthroline-2-carboxylic acid.

9. 1,4 - dihydro-6-methoxy-4-methyl-1-oxo-4,7-phenanthroline-2-carboxylic acid.

10. 1,4-dihydro-6-hydroxy-4-methyl-1-oxo-4,7-phenanthroline-2-carboxylic acid.

11. A process for the preparation of a compound of the formula

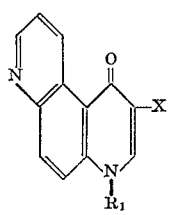

where X is a member selected from the group consisting of carboxy and lower-carbalkoxy, and $R_1$ is a member selected from the group consisting of lower-alkyl and lower-alkenyl, which comprises reacting the corresponding 1-hydroxy-2-X-4,7-phenanthroline of the formula

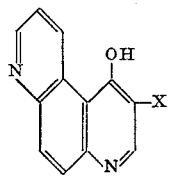

where X has the meaning already given, with an ester having the formula $R_1$—An, where $R_1$ has the meaning already given and An is an anion selected from the group consisting of a strong inorganic acid and an organic sulfonic acid, in the presence of an acid-acceptor.

12. A process for the preparation of 1,4-dihydro-4-(lower-alkyl)-1-oxo-4,7-phenanthroline-2-carboxylic acid which comprises reacting 1-hydroxy-4,7-phenanthroline-2-carboxylic acid with a lower-alkyl halide in the presence of an acid-acceptor.

13. A process for the preparation of 1,4-dihydro-4-(lower - alkyl) - 6 - methoxy-1-oxo-4,7-phenanthroline - 2-carboxylic acid which comprises reacting 1-hydroxy-6-methoxy - 4,7 - phenanthroline-2-carboxylic acid with a lower-alkyl halide in the presence of an acid-acceptor.

14. A compound of the formula

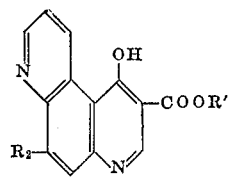

where R' is a member selected from the group consisting of hydrogen and lower-alkyl, and $R_2$ is lower-alkoxy.

15. 1-hydroxy-6-methoxy-4,7-phenanthroline-2-carboxylic acid.

16. A compound of the formula

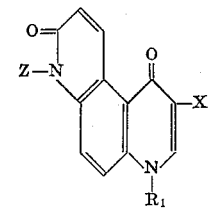

where X is a member selected from the group consisting of carboxy and lower-carbalkoxy; $R_1$ is a member selected from the group consisting of lower-alkyl and lower-alkenyl; and, Z is a member selected from the group consisting of lower-alkyl, lower-alkenyl and benzyl.

17. Ethyl 4,7 - dimethyl - 1,8 - dioxo - 1,4,7,8 - tetrahydro-4,7-phenanthroline-2-carboxylate.

18. 4,7 - dimethyl - 1,8 - dioxo - 1,4,7,8 - tetrahydro-4,7-phenanthroline-2-carboxylic acid.

19. A process for the preparation of a compound of the formula

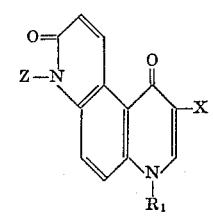

where X is a member selected from the group consisting of carboxy and lower-carbalkoxy; $R_1$ is a member selected from the group consisting of lower-alkyl and lower-alkenyl; and Z is a member selected from the group consisting of lower-alkyl, lower-alkenyl and benzyl: which comprises reacting the corresponding compound of the formula

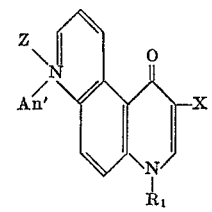

where An' is an anion selected from the group consisting of a strong inorganic acid and an organic sulfonic acid, with a water-soluble ferricyanide in an alkaline medium.

20. A compound of the formula

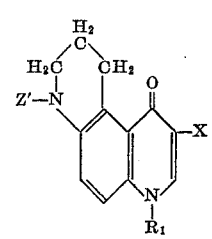

where X is a member selected from the group consisting of carboxy and lower-carbalkoxy; $R_1$ is lower-alkyl; and Z' is a member selected from the group consisting of hydrogen and lower-alkyl.

21. Ethyl 1,4,7,8,9,10 - hexahydro - 4 - methyl - 1 - oxo-4,7-phenanthroline-2-carboxylate.

22. 4,7 - dimethyl - 1,4,7,8,9,10 - hexahydro - 1 - oxo-4,7-phenanthroline-2-carboxylic acid.

References Cited by the Examiner

Elderfield: Heterocyclic Chemistry, vol. IV, Wiley, 1952, pp. 281–5 relied on.

ALEX MAZEL, *Primary Examiner.*

DONALD G. DAUS, *Examiner.*

UNITED STATES PATENT OFFICE
CERTIFICATE OF CORRECTION

Patent No. 3,313,817                                April 11, 1967

George Y. Lesher

It is hereby certified that error appears in the above numbered patent requiring correction and that the said Letters Patent should read as corrected below.

Column 8, line 57, for "at" read -- as --; line 64, for "(564 g.)" read -- (56.4 g.) --; line 67, for "(28.4)" read -- (28.4 g.) --; column 10, line 28, for "hexahydro-oxo" read -- hexahydro-1-oxo --.

Signed and sealed this 28th day of November 1967.

(SEAL)
Attest:

Edward M. Fletcher, Jr.                          EDWARD J. BRENNER

Attesting Officer                                Commissioner of Patents